Patented Feb. 27, 1951

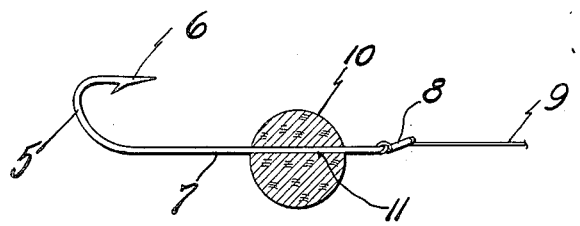
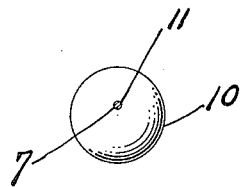
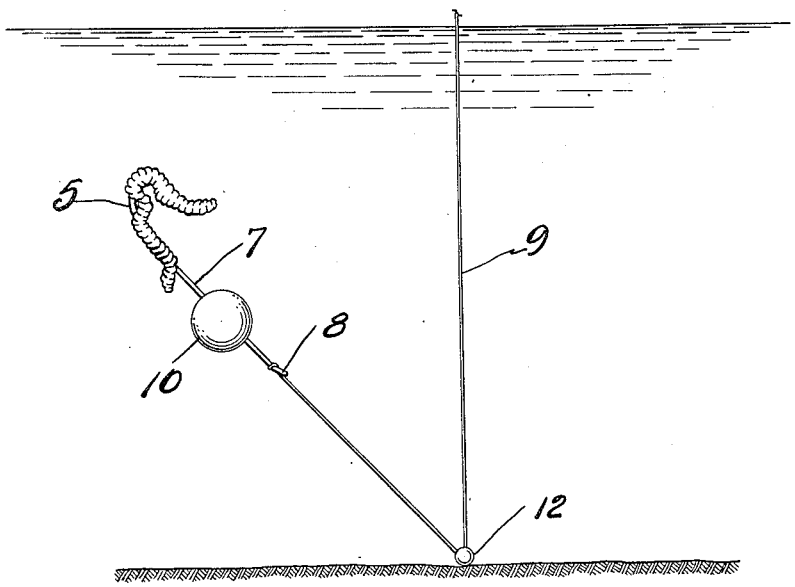
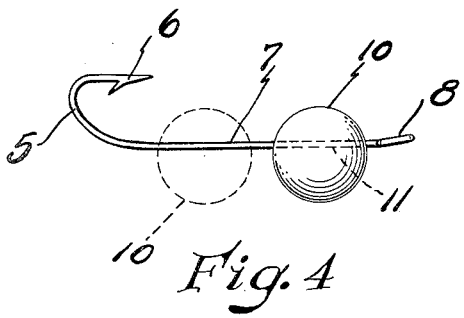

2,543,293

UNITED STATES PATENT OFFICE 2,543,293

FISHHOOK

Francis C. Leitch and James E. Leitch,
Owosso, Mich.

Application July 1, 1949, Serial No. 102,583

2 Claims. (Cl. 43—43.15)

One of the foremost objects of our invention is to provide buoyant means mounted on the shank of the hook for holding the barbed section in predetermined plane to prevent the hook from snagging on logs, debris and obstructions lying on the bottom or immersed in the body of water being fished.

Another object of our invention is to provide buoyant means mounted off-center on the shank of the hook and adjustable thereon so that the fisherman can control the angle at which the hook floats in the water with relation to a vertical line, it being obvious that it is desirable to hook the fish in the top of the mouth.

A further object is to provide a hook which will have a bouncing, natural floating action in the stream when in use, and which can be adjusted to float at any desired distance from the bottom of the stream.

A further object is to provide a very simple, practical, and inexpensive buoyant member mounted on the shank of the hook and adjustable circumferentially and longitudinally thereto to control the position of the barbed section of the hook as it floats or is drawn through the water, as well as controlling the angle of inclination of the hook with relation to a horizontal line.

Still a further object is to provide a buoyant member which can be readily mounted in position on the shank of the fishhook and which bounces over obstacles and snags as it floats or is drawn through the water.

A still further object is to provide means for floating the hook at a predetermined level in the water and thus enable the fisherman to fish or troll over weedbeds without danger of snagging or entanglement.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit or sacrificing any of the advantages of the invention.

In the drawing:

Fig. 1 is a side-elevational view of our hook assembly, the buoyant member being shown in section.

Fig. 2 is an enlarged, end-elevational view illustrating the off-center mounting of the buoyant member.

Fig. 3 is a side-elevational view showing the hook used for still fishing.

Fig. 4 is a side-elevational view illustrating the horizontal adjustment of the buoyant member.

In the drawing, there is shown a conventional off-set hook 5 having a barbed point 6 and an elongated shank 7 terminating in an eye 8 to which a conventional fishing line 9 is secured. A buoyant member 10 is mounted on the shank 7 and is offset with relation thereto, said member being circumferentially and longitudinally adjustable on said shank and in a manner to be hereinafter described.

The buoyant member 10 can be formed of any desired material such as cork, wood, or the like, and in the present instance we have shown it formed of cork preferably spherical in shape, the opening 11 through the body being off center and of slightly less diameter than the shank, so that the buoyant member remains in adjusted, set position, and while in the present instance we have shown the bobber formed of cork, it will be obvious that it can be in the form of a hollow member formed of any suitable material.

The buoyant member 10 forms the bobber of the hook and is always off-center; it has no corners etc. to snag, and when it is desired to fish with the barbed hook end disposed above a center-line through the shank, the bobber is rotated to bring the main section of the bobber below said center-line, thus maintaining the barbed hook in position as indicated in Fig. 1 of the drawing, the angle of inclination from a horizontal line being governed by adjusting the bobber longitudinally on the shank, the counterbalancing effect of the bait on the offset hook 5 being part of the consideration.

In normal practice, the fisherman is able to readily adjust the bobber etc. so that the hook floats at the desired distance from the bottom, it being merely necessary to affix a sinker 12 on the line at a point equal to the distance he wishes to fish from the bottom. In like manner, the position of the device with respect to weedbeds may be varied by merely varying the position of the sinker 12 with relation to the hook.

The hook is practically snag-proof, as the barbed end can be held and maintained upright, the buoyant member striking any snags or obstructions and bouncing off in a natural, life-like manner.

The hook can be made up in any desired color; it can be adjusted to float on the water or counterbalanced to maintain it at a predetermined distance below the surface, and when above water, has the appearance of a bug crawling on the water.

While we have shown the preferred embodiment of our invention, it is to be understood that various changes in the size, shape and arrangement of parts may be resorted to without departing from the spirit of the invention and the scope of the following claims.

What we claim is:

1. The combination with a fishhook having an elongated shank, of a globular shaped buoyant member mounted off center on said shank and frictionally held in set position thereon, said member being rotatably adjustable on said shank.

2. The combination with a fishhook having an elongated shank, of a ball-shaped buoyant cork member eccentrically mounted on said shank and adjustable rotatably and longitudinally thereon, said member having tight frictional engagement with said shank throughout its diameter to secure it in adjusted positions.

FRANCIS C. LEITCH.
JAMES E. LEITCH.

REFERENCES CITED

The following references are of record in the file of this patent:

UNITED STATES PATENTS

| Number | Name | Date |
| --- | --- | --- |
| 1,801,940 | Stanley | Apr. 21, 1931 |
| 1,991,253 | Kerns | Feb. 12, 1935 |